United States Patent Office 2,959,558
Patented Nov. 8, 1960

2,959,558
MODIFIED UREA RESINS AND COATING COMPOSITIONS CONTAINING SAME

Harry M. Culbertson, Wilbraham, and Frank J. Hahn, Springfield, Mass., assignors to Monsanto Chemical Company, St. Louis, Mo., a corporation of Delaware No Drawing. Filed Dec. 4, 1957, Ser. No. 700,538

13 Claims. (Cl. 260—21)

This invention relates to modified urea resins which are particularly suitable for use in protective coating compositions. More particularly, the invention relates to etherified co-condensation products of urea, an N-substituted melamine of the group consisting of N,N'-dicyclohexylmelamine, N,N',N" - tricyclohexylmelamine and mixtures thereof and formaldehyde. The invention further relates to protective coating compositions containing such modified urea resins.

Background of the invention

Etherified urea-formaldehyde resins and etherified co-condensates of urea, melamine and formaldehyde have utility in many industrial fields including the protective coating arts. In particular, protective coating compositions containing blends of such etherified urea-formaldehyde resins and oil-modified alkyd resins have been widely used as baking enamels. While such protective coating compositions have many desirable characteristics, their gloss and flexibility are somewhat deficient.

Accordingly, it is an object of this invention to provide novel urea-formaldehyde resins having improved properties.

Another object of the invention is to provide novel urea-formaldehyde resins which are particularly suitable for use in protective coating compositions.

Yet another object of the invention is to provide novel protective coating compositions containing novel urea-formaldehyde resins.

Other objects and advantages of the invention will be apparent from the following detailed descriptions thereof.

Summary of the invention

In accordance with this invention there are provided novel urea-formaldehyde resins which comprise an etherified reaction product of at least 2 mols of a monohydric alcohol containing 1–6 carbon atoms and a co-condensation product of 1 mol of urea, 0–0.3 mol of melamine, 0.02–0.5 mol of an N-substituted melamine of the group consisting of N,N'-dicyclohexylmelamine, N,N',N"-tricyclohexylmelamine and mixtures thereof and at least 2 mols of formaldehyde. In a further embodiment of the invention there are provided protective coating compositions which contain a novel urea-formaldehyde resin of the type described above and an oil-modified alkyd resin. The invention further relates to protective coating compositions containing a ternary mixture of (1) a novel urea-formaldehyde resin of the type described above, (2) an etherified urea-formaldehyde resin, and (3) an oil-modified alkyd resin. In still another embodiment of the invention there are provided protective coating compositions consisting of a ternary mixture of (1) an oil-modified alkyd resin, (2) an etherified urea-formaldehyde resin and (3) an etherified N-substituted melamine-formaldehyde resin in which the N-substituted melamine is selected from the group consisting of N,N'-dicyclohexylmelamine, N,N',N" - tricyclohexylmelamine and mixtures thereof. In yet another embodiment of the invention there are provided protective coating compositions consisting of a quaternary mixture of (1) an oil-modified alkyd resin, (2) a novel urea-formaldehyde resin of the type described above, (3) an etherified urea-formaldehyde resin and, (4) an etherified N-substituted melamine-formaldehyde resin in which the N-substituted melamine is selected from the group consisting of N,N'-dicyclohexylmelamine, N,N',N" - tricyclohexylmelamine and mixtures thereof.

Experimental

The following examples are set forth to illustrate more clearly the principle and practice of the invention to those skilled in the art. Unless otherwise stated, where quantities are mentioned they are parts by weight.

EXAMPLE I

Reactants consisting of 63 parts (1.05 mol) of urea, 39 parts (0.15 mol) of N,N',N"-tricyclohexylmelamine, 86 parts (2.62 mols) of paraform, 250 parts (3.4 mols) of n-butanol, 28 parts of water and 1 part of triethanolamine are charged to a reaction vessel equipped with a stirrer and a condenser that is fitted with a decanting esterification head. The alkaline solution (pH=8.5) is refluxed for 1.0 hour with all of the condensate being returned to the reaction flask.

After adjusting the pH of the system to 6.2 with oxalic acid, the reaction mixture is again heated to reflux. During this phase of the reaction, the decanting head is set to continuously remove the water phase which separates in the distillation head and to return the butanol phase to the reaction flask. A total of 45 parts of water phase is removed over a 5-hour period. The balance of the water remaining in the reaction mixture is removed by refluxing the reaction mixture with the esterification head being set for total takeoff. The distillation is continued until the boiling point of the distillate rises to 108° C. This step requires about 0.5 hour. As the distillate is removed, an equivalent quantity of dry butanol is continuously added to the reaction flask. After cooling, the butanol is removed by vacuum distillation and the resin is recovered as a heavy viscous liquid.

EXAMPLE II

Example I is repeated except that the quantity of N,N',N"-tricyclohexylmelamine charged to the reaction is reduced to 19 parts (0.05 mol). Similiarly, the quantity of n-butanol charged to the reaction is reduced to 220 parts (3.0 mol). The resin is obtained as a thick viscous liquid.

EXAMPLE III

Reactants consisting of 60 parts (1 mol) of urea, 19 parts (0.05 mol) of N,N',N"-tricyclohexylmelamine, 19 parts (0.18 mol) of melamine, 290 parts (3.58 mols) of formalin (37% formaldehyde), 300 parts (4.05 mol) of butanol, and 4 parts of a 5% aqueous NaOH solution are charged to the reaction vessel described in Example I. The alkaline solution (pH=10.5) is refluxed for 1.0 hour with all of the condensate being returned to the reaction flask.

After adjusting the pH of the system to 6.0 with oxalic acid, the reaction mixture is again heated to reflux. During this phase of the reaction, the decanting head is set to continuously remove the water phase which separates in the distillation head and to return the butanol phase to the reaction flask. A total of 190 parts of water phase is removed over a 5-hour period. The balance of the water remaining in the reaction mixture is removed by refluxing the reaction mixture with the esterification head being set for total takeoff. The distillation is continued until the boiling point of the distillate rises to 108° C. This step requires about 0.5 hour. As the distillate is removed, an equivalent quantity of dry butanol is continuously added to the reaction flask. After cooling, the butanol is removed by vacuum distillation and the resin is recovered as a viscous liquid.

EXAMPLE IV

Example I is repeated except that the N,N',N''-tricyclohexylmelamine is replaced with a stoichiometrically equivalent quantity of N,N'-dicyclohexylmelamine.

EXAMPLE V

Reactants consisting of 370 parts (1.0 mol) of N,N',N''-tricyclohexylmelamine, 325 parts (4 mols) of formalin (37% formaldehyde), 600 parts (8 mols) of n-butanol and 4 parts of a 5% aqueous NaOH solution are charged to a reaction vessel equipped with a stirrer and a condenser that is fitted with a decanting esterification head. The alkaline solution (pH=10.5) is refluxed for 1.0 hour with all of the condensate being returned to the reaction flask.

After adjusting the pH of the system to 6.4 with oxalic acid, the reaction mixture is again heated to reflux. During this phase of the reaction, the decanting head is set to continuously remove the water phase which separates in the distillation head and to return the butanol phase to the reaction flask. A total of 200 parts of water phase is removed over a 4-hour period. The balance of the water remaining in the reaction mixture is removed by refluxing the reaction mixture with the esterification head being set for total takeoff. The distillation is continued until the boiling point of the distillate rises to 108° C. This step requires about 0.5 hour. As the distillate is removed, an equivalent quantity of dry butanol is continuously added to the reaction flask. After cooling, the resin solution is concentrated to 50% solids by removing additional butanol by vacuum distillation.

EXAMPLE VI

The following protective coating compositions are prepared in which the figures listed are parts by weight:

| Component | Coating Compositions | | | |
| --- | --- | --- | --- | --- |
| | A | B | C | Control |
| Resin Of Example I | 10 | | | |
| Resin Of Example II | | 10 | | |
| Resin Of Example III | | | 10 | |
| Prior Art Resin 1 | | | | 10 |
| Alkyd Resin | 20 | 20 | 20 | 20 |
| Titanium Dioxide | 25 | 25 | 25 | 25 |
| Butanol | 10 | 10 | 10 | 10 |
| Xylol | 35 | 35 | 35 | 35 |

The alkyd resin included in the above compositions consists of a blend of two parts of a glyceryl phthalate resin modified with 35 weight percent of coconut oil fatty acids and one part of a glyceryl phthalate resin modified with 40 weight percent of soybean oil fatty acids. Prior Art Resin 1 included in the control composition is a commercially available butyl ether of a urea-formaldehyde resin.

A series of steel panels are spray-coated with the above coating compositions and the films are cured by heating for, respectively, 60 minutes at 180° F., 30 minutes at 225° F. and 20 minutes at 300° F. The cured films are 2 mils thick. The Sward hardness of each of the films is measured and reported in Table I.

TABLE I

| Sward Hardness | Coating Composition | | | |
| --- | --- | --- | --- | --- |
| | A | B | C | Control |
| 60 min. @ 180° F. | 22 | 24 | 20 | 10 |
| 30 min. @ 225° F. | 38 | 38 | 36 | 22 |
| 20 min. @ 300° F. | 44 | 46 | 46 | 38 |

The detergent resistance of each of the films is measured by ASTM Method D 714-45 in which the panels are maintained in an 0.5% aqueous detergent solution at 160° F. At each curing condition, the films prepared from the experimental compositions are more resistant than the film prepared from the control composition.

The films prepared from the experimental coating compositions do not crack when the steel panels are bent through 180° C. over a conical mandrel as prescribed by ASTM Method D 522-41.

The above data indicate that coating compositions containing the novel urea-formaldehyde resins of this invention, as compared with coating compositions containing prior art urea-formaldehyde coating resins, (1) cure faster, (2) provide harder films of superior flexibility and (3) provide films having superior detergent resistance.

EXAMPLE VII

Additional steel panels are spray-coated with the coating compositions described in Example VI. One series of the panels is cured for 20 minutes at 300° F. and a second series of the panels is baked for 16 hours at 300° F. The panels are examined visually and within each series the gloss obtained with the experimental coating compositions is superior to the gloss obtained from the control composition. These data establish that the initial gloss and the gloss retention on overbaking of the experimental coating compositions are excellent and superior to the control coating composition.

EXAMPLE VIII

The following protective coating composition is prepared:

| Component: | Parts |
| --- | --- |
| Alkyd resin | 15.0 |
| Resin of Example IV | 15.0 |
| Titanium dioxide | 15.0 |
| Lampblack | 0.2 |
| Xylol | 40.0 |
| Butanol | 15.0 |

The alkyd resin included in the above formulation is a glyceryl phthalate resin modified with about 42 weight percent of dehydrated castor oil fatty acids. The coating composition is sprayed onto a steel panel and baked for 20 minutes at 300° F. The resulting film is very hard and has high gloss, good flexibility and good detergent resistance.

EXAMPLE IX

Four unpigmented, clear baking varnishes are prepared by including each of the resins of Example I-IV in the following formulation:

| Component: | Parts |
| --- | --- |
| Alkyd resin | 27.00 |
| Aminoplast resin | 3.00 |
| Hydrocarbon solvent | 50.00 |
| Butanol | 5.00 |
| Cobalt naphthenate | 0.06 |

The alkyd resin included in the formulation is a glyceryl phthalate resin modified with about 62 weight percent of soybean oil fatty acids. The hydrocarbon solvent is a commercial mixture of petroleum aliphatic hydrocarbons. The varnishes are sprayed onto steel panels and baked for 20 minutes at 300° F. to provide hard films having high gloss, good flexibility and good detergent resistance.

EXAMPLE X

Protective coating compositions of the following formulations have excellent properties and are included within the scope of the present invention. The figures listed are parts by weight.

| Component | Coating Composition |||||||||||||
|---|---|---|---|---|---|---|---|---|---|---|---|---|---|
| | A | B | C | D | E | F | G | H | I | J | K | L | M |
| Resin Of Example I | 4 | | | | | 2 | | | | | | | |
| Resin Of Example II | | 4 | | | | | | 2 | | | | | |
| Resin Of Example III | | | 4 | | | | | | 2 | | | | |
| Resin Of Example IV | | | | 4 | | | | | | 2 | | | 3 |
| Resin Of Example V | | | | | 2 | 2 | 1 | 1 | 1 | 1 | 3 | 3 | |
| Isobutyl Ether of a Urea-Formaldehyde Resin | | | | | | 8 | 7 | 7 | 7 | 7 | | 7 | |
| Butyl Ether of a Urea-Formaldehyde Resin | 6 | 6 | 6 | 6 | 8 | | | | | | 7 | | 7 |
| Alkyd Resin | 20 | 20 | 20 | 20 | 20 | 20 | 20 | 20 | 20 | 20 | 10 | 20 | 20 |
| Titanium Dioxide | 25 | 25 | 25 | 25 | 25 | 25 | 25 | 25 | 25 | 25 | 25 | 25 | 25 |
| Butanol | 5 | 5 | 5 | 5 | 5 | 5 | 5 | 5 | 5 | 5 | 5 | 5 | 5 |
| Xylol | 40 | 40 | 40 | 40 | 40 | 40 | 40 | 40 | 40 | 40 | 40 | 40 | 40 |

The alkyd resin employed is described in Example VI. Both the butyl ether of the urea-formaldehyde resin and the isobutyl ether of the urea-formaldehyde resin are commercially available resins.

Discussion

The urea-formaldehyde resins of this invention are the etherified reaction product of at least 2 mols of a monohydric alcohol containing 1–6 carbon atoms and a co-condensation product of 1 mol of urea, 0–0.3 mol of melamine, 0.02–0.5 mol of an N-substituted melamine of the group consisting of N,N'-dicyclohexylmelamine, N,N',N''-tricyclohexylmelamine and mixtures thereof, and at least 2 mols of formaldehyde. In a preferred embodiment of the invention, the urea-formaldehyde resins are the etherified reaction product of a butanol and a co-condensation product of urea, N,N',N''-tricyclohexylmelamine and formaldehyde.

The co-condensates employed in the invention are prepared by heating the urea, the melamine (if any), the N-substituted melamine and the formaldehyde under alkaline conditions, e.g., at a pH of 8.5–10.5, in a suitable solvent such as water, a 1–6 carbon atom monohydric alcohol or a water-alcohol mixture. If melamine is included in the co-condensate, it is employed in the amount of up to 0.3 mol and preferably 0.02–0.20 mol per mol of urea. The quantity of N-substituted melamine employed is 0.02–0.5 or preferably 0.05–0.2 mol per mol of urea. The minimum quantity of formaldehyde employed is at least 2 mols per mol of urea, but preferably the formaldehyde is employed in a quantity sufficient to react with each of the reactive hydrogen atoms contained in the urea, the melamine (if any) and the N-substituted melamine. In calculating the quantity of formaldehyde to be employed, urea is considered as containing 2 reactive hydrogen atoms, melamine contains 6 reactive hydrogen atoms, N,N'-dicyclohexylmelamine contains 4 reactive hydrogen atoms, and N,N',N''-tricyclohexylmelamine contains 3 reactive hydrogen atoms. The N,N'-dicyclohexylmelamine employed in the invention may be obtained by reacting 2 mols of cyclohexylamine with 1 mol of 2,4-dichloro-6-amino-s-triazine and the N,N',N''-tricyclohexylmelamine may be obtained by reacting 3 mols of cyclohexylamine with 1 mol of cyanuric chloride. Alternatively, both of these compounds may be prepared by the method disclosed in U.S. Patent 2,361,823.

The etherified resins are prepared by heating the co-condensate of urea, melamine (if any), the N-substituted melamine and formaldehyde with at least 2 mols of a monohydric alcohol containing 1–6 or preferably 3–6 carbon atoms under acid conditions, e.g., at a pH of about 4.0–6.5. During this reaction, the co-condensation product is both etherified and polymerized. Thus, the alcohol functions as both a reactant and as a solvent for the reaction. Preferably, the reaction is carried out under reflux conditions (at either atmospheric or reduced pressure) so that water may be removed from the reaction system by azeotropic distillation. To maintain the minimum quantity of alcohol required in the reaction system when operating under reflux conditions, it is necessary (1) to return the distilled alcohol to the reaction system, or (2) add alcohol to the reaction system as makeup, or (3) initially charge a large excess of alcohol to the reaction. Essentially any 1–6 carbon atom monohydric alcohol such as methanol, ethanol, propanol or hexanol may be employed in the etherification reaction. The alcohol employed will to a large degree be influenced by the use that is to be made of the resin. Where the resin is to be employed in protective coating compositions, we prefer to use n-butanol or especially isobutanol for this purpose. After the etherification reaction is complete, the resin solutions may be concentrated to the desired solids level or recovered in solvent-free form by removing the solvent alcohol by vacuum distillation.

The resins of the invention may be used in the manufacture of textile printing pastes, as an ingredient in adhesive formulations, in the resin finishing of textiles (especially cottons), etc. The resins also may be used per se or in conjunction with other film-forming resins in the preparation of protective coating compositions.

The present invention is also concerned with protective coating compositions which contain as the film-forming polymers a binary mixture of a urea-formaldehyde resin of the type herein described and an oil-modified alkyd resin. The novel urea-formaldehyde resins are compatible with alkyd resins of all oil lengths in virtually all proportions. Preferably, however, the resinous components of the coating compositions of primary concern consist of 10–50 weight percent of the urea-formaldehyde resin and, correspondingly, 90–50 weight percent of the oil-modified alkyd resin.

The invention further relates to protective coating compositions which contain as the film-forming polymers a ternary mixture of (1) a novel urea-formaldehyde resin of the type described above, (2) an etherified urea-formaldehyde resin and (3) an oil-modified alkyd resin. The oil-modified alkyd resin ordinarily will constitute 50–90 weight percent of the total of the above 3 film-forming polymers. The novel urea-formaldehyde resin in turn ordinarily will constitute at least 20 weight percent and preferably 20–75 weight percent of the binary mixture of the novel urea-formaldehyde resin and the etherified urea-formaldehyde resin.

The etherified urea-formaldehyde resins included in the protective coating compositions described in the paragraph above are known in the art. Chemically, these resins are the etherified reaction product of at least 2 mols of a monohydric alcohol containing 1–6 and preferably 3–6 carbon atoms and a condensation product of 1 mol of urea and at least about 2 mols of formaldehyde. Preferably, the monohydric alcohol employed to etherify the urea-formaldehyde condensate is a butanol such as n-butanol or isobutanol.

In still another embodiment of the invention there are provided protective coating compositions in which the film-forming polymers consist of a ternary mixture of (1) an oil-modified alkyd resin, (2) an etherified urea-formaldehyde resin of the type described in the paragraph immediately above and (3) an etherified N-substituted melamine-formaldehyde resin in which the N-substituted melamine is selected from the group consisting of N,N'-dicyclohexylmelamine, N,N',N''-tricyclohexylmelamine and mixtures thereof. The oil-modified alkyd resin ordinarily will constitute 50–90 weight percent of the total of the above 3 film-forming polymers.

The etherified N-substituted melamine-formaldehyde resin in turn will constitute 5–80 weight percent and preferably 5–30 weight percent of the binary mixture of said etherified N-substituted melamine-formaldehyde resin and the etherified urea-formaldehyde resin.

The etherified N-substituted melamine-formaldehyde resins included in the protective coating compositions described in the paragraph immediately above are the etherified reaction product of at least 3 mols of a monohydric alcohol containing 1–6 and preferably 3–6 carbon atoms and a condensation product of 1 mol of an N-substituted melamine of the group consisting of N,N'-dicyclohexylmelamine, N,N',N'' - tricyclohexylmelamine and mixtures thereof, and at least 1 mol of formaldehyde. In a preferred embodiment of the invention, these resins are an etherified reaction product of n-butanol or isobutanol and a condensation product of N,N',N''-tricyclohexylmelamine and formaldehyde. A detailed description of such resin is contained in the co-pending application of Harry M. Culbertson and Byron L. Williams, Jr., S.N. 700,534 filed of even date herewith and that description is incorporated herein by reference. The reference application and the present application are owned by a common assignee.

In yet another embodiment of the invention there are provided protective coating compositions in which the film-forming polymers consist of 50–90 weight percent of an oil-modified alkyd resin and, correspondingly, 50–10 weight percent of a ternary mixture of aminoplast resins consisting of (a) a novel urea-formaldehyde resin of the type herein described, (b) an etherified urea-formaldehyde resin of the type described in the third paragraph above, and (c) an etherified N-substituted melamine-formaldehyde resin of the type described in the first paragraph above. In these compositions the component (c) constitutes about 5–80 weight percent of the total of (a), (b) and (c). The remaining components (a) and (b) may be included in virtually any desired proportions but usually will be employed in a weight ratio of from 1:2 to 2:1. Coating compositions (G), (H), (I) and (J) of Example X illustrate this type of coating composition.

The alkyd resins employed in the protective coating compositions above described are the condensates of polyhydric alcohols such as glycols, glycerol, sorbitol, pentaerythritol, etc. with polybasic acids or anhydrides thereof, e.g., phthalic acid, phthalic anhydride, isophthalic acid, maleic acid, maleic anhydride, fumaric acid, adipic acid, azelaic acid, etc. These alkyd resins are modified with drying, semi-drying and non-drying oils such as coconut oil, castor oil, dehydrated castor oil, soybean oil, linseed oil, tung oil, or the alcohols, acids and gycerides derived therefrom. The oil-modified alkyd resins having the best balance of properties for inclusion in the protective coating compositions of the invention contan 30–70% and preferably 30–40% by weight of combined oil acids. As is known, such acids contain about 12–20 carbon atoms.

The protective coating compositions of interest will comprise 20–70% of the mixture of the aminoplast resin (or resins) and the oil-modified alkyd resin dissolved in a suitable organic solvent such as hydrocarbons, alcohols, ethers, ketones, esters, and mixtures thereof, e.g., xylol-butanol and aliphatic hydrocarbon-butanol mixtures. Pigments, driers and other conventional ingredients may be included in the coating compositions. Such compositions usually will be formulated to have a total solids content of about 40–60%.

The coating compositions of the invention may be advantageously employed to protect wooden, paper and metal surfaces. The coating compositions may be applied to the surfaces to be protected by conventional methods of application such as brushing, spraying, roll coating, dipping, etc. The films may be cured by heating for short periods of time at 180–400 F°.

The above descriptions and particularly the examples are set forth by way of illustration only. Many other variations and modifications of the invention will be apparent to those skilled in the art and may be employed without departing from the spirit and scope of the invention herein described.

What is claimed is:

1. A resin comprising an etherified reaction product of at least 2 mols of a monohydric acyclic alcohol containing 1–6 carbon atoms and a co-condensation product of 1 mol of urea, 0–0.3 mol of melamine, 0.02–0.5 mol of an N-substituted melamine of the group consisting of N,N'-dicyclohexylmelamine, N,N',N''-tricyclohexylmelamine and mixtures thereof, and at least 2 mols of formaldehyde.

2. A resin comprising an etherified reaction product of at least 2 mols of n-butanol and a co-condensation product of 1 mol of urea, 0–0.3 mol of melamine, 0.02–0.5 mol of an N-substituted melamine of the group consisting of N,N'-dicyclohexylmelamine, N,N',N''-tricyclohexylmelamine and mixtures thereof, and at least 2 mols of formaldehyde.

3. A resin comprising an etherified reaction product of at least 2 mols of n-butanol and a co-condensation product of 1 mol of urea, 0–0.3 mol of melamine, 0.05–0.2 mol of N,N'N''-tricyclohexylmelamine and at least 2 mols of formaldehyde.

4. A resin comprising an etherified reaction product of at least 2 mols of isobutanol and a co-condensation product of 1 mol of urea, 0–0.3 mol of melamine, 0.05–0.2 mol of N,N',N''-tricyclohexylmelamine and at least 2 mols of formaldehyde.

5. A process for preparing a resin which comprises heating 1 mol of urea, 0–0.3 mol of melamine, 0.02–0.5 mol of an N-substituted melamine of the group consisting of N,N'-dicyclohexylmelamine, N,N',N''-tricyclohexylmelamine and mixtures thereof and at least 2 mols of formaldehyde in an aqueous medium under alkaline conditions to co-condense said reactants and then etherifying said co-condensation product by heating said co-condensation product and at least 2 mols of a monohydric acyclic alcohol containing 1–6 carbon atoms to substantially atmospheric reflux temperature under acidic conditions.

6. A protective coating composition comprising an organic solvent solution of a mixture of an oil-modified alkyd resin and an etherified reaction product of at least 2 mols of a monohydric acyclic alcohol containing 1–6 carbon atoms and a co-condensation product of 1 mol of urea, 0–0.3 mol of melamine, 0.02–0.5 mol of an N-substituted melamine of the group consisting of N,N'-dicyclohexylmelamine, N,N',N''-tricyclohexylmelamine and mixtures thereof and at least 2 mols of formaldehyde.

7. A protective coating composition as in claim 6 wherein the oil-modified alkyd resin contains 30–70 weight percent of combined fatty acid moiety.

8. A protective coating composition comprising an organic solvent solution of a ternary mixture of (1) an oil-modified alkyd resin, (2) an etherified reaction product of at least 2 mols of a monohydric acyclic alcohol containing 1–6 carbon atoms and a co-condensation product of 1 mol of urea, 0–0.3 mol of melamine, 0.02–0.5 mol of an N-substituted melamine of the group consisting of N,N'-dicyclohexylmelamine, N,N',N''-tricyclohexylmelamine and mixtures thereof and at least 2 mols of formaldehyde and (3) an etherified reaction product of at least 2 mols of a monohydric acyclic alcohol containing 1–6 carbon atoms and a condensation product of 1 mol of urea and at least 2 mols of formaldehyde; said oil-modified alkyd resin constituting 50–90 weight percent of the total of (1), (2) and (3); said component (2) constituting at least 20 weight percent of the total of (2) and (3).

9. A protective coating composition as in claim 8 wherein the oil-modified alkyd resin contains 30–70 weight percent of combined fatty acid moiety.

10. A protective coating composition comprising an organic solvent solution of a ternary mixture of (1) an oil-modified alkyd resin, (2) an etherified reaction product of at least 2 mols of a monohydric acyclic alcohol containing 1–6 carbon atoms and a condensation product of 1 mol of urea and at least about 2 mols of formaldehyde and (3) an etherified reaction product of at least 3 mols of a monohydric acyclic alcohol containing 1–6 carbon atoms and a condensation product of 1 mol of an N-substituted melamine of the group consisting of N,N'-dicyclohexylmelamine, N,N',N''-tricyclohexylmelamine and mixtures thereof and at least 1 mol of formaldehyde; said alkyd resin constituting 50–90 weight percent of the total of (1), (2) and (3); said component (3) constituting 5–80 weight percent of the total of (2) and (3).

11. A protective coating composition as in claim 10 wherein the oil-modified alkyd resin contains 30–70 weight percent of combined fatty acid moiety.

12. A protective coating composition comprising an organic solvent solution of 50–90 weight percent of an oil-modified alkyd resin and, correspondingly, 50–10 weight percent of a ternary mixture of (a) an etherified reaction product of at least 2 mols of a monohydric acyclic alcohol containing 1–6 carbon atoms and a co-condensation product of 1 mol of urea, 0–0.3 mol of melamine, 0.02–0.5 mol of an N-substituted melamine of the group consisting of N,N'-dicyclohexylmelamine, N,N',N''-tricyclohexymelamine and mixtures thereof and at least 2 mols of formaldehyde, (b) an etherified reaction product of at least 2 mols of a monohydric acyclic alcohol containing 1–6 carbon atoms and a condensation product of 1 mol of urea and at least about 2 mols of formaldehyde and (c) an etherified reaction product of at least 3 mols of a monohydric acyclic alcohol containing 1–6 carbon atoms and a condensation product of 1 mol of an N-substituted melamine of the group consisting of N,N'-dicyclohexylmelamine, N,N',N''-tricyclohexylmelamine and mixtures thereof and at least 1 mol of formaldehyde, said component (c) constituting 5–80 weight percent of the total of (a), (b) and (c).

13. A protective coating composition comprising an organic solvent solution of a mixture of an oil-modified alkyd resin and an aminoplast resin of the group consisting of (a) an etherified reaction product of at least 2 mols of a monohydric acyclic alcohol containing 1–6 carbon atoms and a co-condensation product of 1 mol of urea, 0–0.3 mol of melamine, 0.02–0.5 mol of an N-substituted melamine and at least 2 mols of formaldehyde; (b) a binary mixture of (1) an etherified reaction product of at least 2 mols of a monohydric acyclic alcohol containing 1–6 carbon atoms and a co-condensation product of 1 mol of urea, 0–0.3 mol of melamine, 0.02–0.5 mol of an N-substituted melamine and at least 2 mols of formaldehyde and (2) an etherified reaction product of at least 2 mols of a monohydric acyclic alcohol containing 1–6 carbon atoms and a condensation product of 1 mol of urea and at least 2 mols of formaldehyde, said component (1) constituting at least 20 weight percent of the total of (1) and (2); (c) a binary mixture of (3) an etherified reaction product of at least 2 mols of a monohydric acyclic alcohol containing 1–6 carbon atoms and a condensation product of 1 mol of urea and at least about 2 mols of formaldehyde and (4) an etherified reaction product of at least 3 mols of a monohydric acyclic alcohol containing 1–6 carbon atoms and a condensation product of 1 mol of an N-substituted melamine and at least 1 mol of formaldehyde, said component (4) constituting 5–80 weight percent of the total of (3) and (4); and (d) a ternary mixture (5) of an etherified reaction product of at least 2 mols of a monohydric acyclic alcohol containing 1–6 carbon atoms and a co-condensation product of 1 mol of urea, 0.03 mol of melamine, 0.02–0.5 mol of an N-substituted melamine and at least 2 mols of formaldehyde, (6) an etherified reaction product of at least 2 mols of a monohydric acyclic alcohol containing 1–6 carbon atoms and a condensation product of 1 mol of urea and at least 2 mols of formaldehyde, (7) an etherified reaction product of at least 3 mols of a monohydric acyclic alcohol containing 1–6 carbon atoms and a condensation product of 1 mol of an N-substituted melamine and at least 1 mol of formaldehyde, said component (7) constituting 5–80 weight percent of the total of (5), (6) and (7); the N-substituted melamine included in aminoplast resins (a), (1), (4), (5) and (7) being selected from the group consisting of N,N'-dicyclohexylmelamine, N,N',N''-tricyclohexylmelamine and mixtures thereof.

References Cited in the file of this patent

UNITED STATES PATENTS

| Re. 24,351 | Varela et al. | Aug. 27, 1957 |
| 2,197,357 | Widmer et al. | Apr. 16, 1940 |
| 2,209,292 | Berger | July 23, 1940 |
| 2,294,590 | West | Sept. 1, 1942 |
| 2,361,823 | D'Alelio | Oct. 31, 1944 |
| 2,508,876 | Scott et al. | May 23, 1950 |
| 2,545,049 | Schaefer et al. | Mar. 13, 1951 |

OTHER REFERENCES

Hodgins et al.: Melamine-Formaldehyde Film Forming Compositions, pages 769–779, Ind. & Eng. Chem., vol. 33, No. 6 (June 1941).

UNITED STATES PATENT OFFICE
CERTIFICATION OF CORRECTION

Patent No. 2,959,558                 November 8, 1960

Harry M. Culbertson et al.

It is hereby certified that error appears in the above numbered patent requiring correction and that the said Letters Patent should read as corrected below.

Columns 5 and 6, in the Table, under column "K" thereof, the third figure therein, for "10" read -- 20 --; column 10, line 25, for "0.03" read -- 0-0.3 --.

Signed and sealed this 2nd day of May 1961.

(SEAL)
Attest:

ERNEST W. SWIDER
Attesting Officer

DAVID L. LADD
Commissioner of Patents